United States Patent
Aposhian et al.

(10) Patent No.: US 9,022,720 B2
(45) Date of Patent: May 5, 2015

(54) ELECTRICALLY OPERATED TURF STACKING SYSTEM FOR SOD HARVESTING MACHINE

(71) Applicants: Steven R. Aposhian, Farmington, UT (US); Eric E. Aston, Salt Lake City, UT (US); William M. Decker, Salt Lake City, UT (US); Samuel Drake, Cottonwood Heights, UT (US)

(72) Inventors: Steven R. Aposhian, Farmington, UT (US); Eric E. Aston, Salt Lake City, UT (US); William M. Decker, Salt Lake City, UT (US); Samuel Drake, Cottonwood Heights, UT (US)

(73) Assignee: Firefly Equipment, LLC, Farmington, UT (US)

( * ) Notice: Subject to any disclaimer, the term of this patent is extended or adjusted under 35 U.S.C. 154(b) by 126 days.

(21) Appl. No.: 13/851,418

(22) Filed: Mar. 27, 2013

(65) Prior Publication Data
US 2013/0259630 A1    Oct. 3, 2013

Related U.S. Application Data

(60) Provisional application No. 61/619,357, filed on Apr. 2, 2012.

(51) Int. Cl.
| | |
|---|---|
| *B65G 47/24* | (2006.01) |
| *G05B 19/23* | (2006.01) |
| *A01B 45/04* | (2006.01) |
| *B65G 47/08* | (2006.01) |

(52) U.S. Cl.
CPC ............... *B65G 47/24* (2013.01); *A01B 45/045* (2013.01); *B65G 47/086* (2013.01); *G05B 19/23* (2013.01); *Y10S 414/106* (2013.01)

(58) Field of Classification Search
USPC ............ 172/19, 20; 414/751.1, 790.8, 791.2, 414/792, 792.1, 792.4, 792.7, 792.8, 792.9, 414/793, 799, 927, 928, 752.1; 901/16
See application file for complete search history.

(56) References Cited

U.S. PATENT DOCUMENTS

| | | | | |
|---|---|---|---|---|
| 3,877,584 | A * | 4/1975 | Holcombe | 414/789.7 |
| 3,884,363 | A * | 5/1975 | Ajlouny | 414/626 |
| 3,954,190 | A * | 5/1976 | Howard et al. | 414/790 |
| 4,714,400 | A * | 12/1987 | Barnett et al. | 414/751.1 |
| 5,028,203 | A * | 7/1991 | Masini | 414/792.9 |
| 5,269,379 | A * | 12/1993 | Millar et al. | 172/19 |
| 5,605,432 | A * | 2/1997 | Fink et al. | 414/752.1 |
| 5,697,760 | A * | 12/1997 | Rosen | 414/789.7 |
| 5,738,484 | A * | 4/1998 | Taylor | 414/788.1 |
| 6,527,502 | B2 * | 3/2003 | Leijenaar | 414/792 |
| 7,467,667 | B2 * | 12/2008 | Pohlman et al. | 172/20 |
| 7,740,083 | B2 * | 6/2010 | Tvetene | 172/20 |
| 2008/0025834 | A1 * | 1/2008 | Ponti et al. | 414/799 |
| 2009/0121663 | A1 * | 5/2009 | Sejimo | 318/400.04 |
| 2010/0252286 | A1 * | 10/2010 | Brouwer et al. | 172/19 |

\* cited by examiner

*Primary Examiner* — Gregory Adams
(74) *Attorney, Agent, or Firm* — Brian Tucker; Kirton McConkie (57) ABSTRACT

The present invention extends to a stacking mechanism having electrical actuators for stacking slabs of sod on a sod harvesting machine. The electrical actuators allow the stacking head to be driven in three axes. The stacking mechanism also includes position feedback sensors for reporting the position of the stacking head to enable precision when operating the stacking head at a fast rate. The stacking mechanism of the present invention also provides temporary pallet support wings to enable the continued stacking of slabs of sod on one pallet even while another pallet is being dropped from the sod harvesting machine.

20 Claims, 13 Drawing Sheets

ELECTRICALLY OPERATED TURF STACKING SYSTEM FOR SOD HARVESTING MACHINE

CROSS-REFERENCE TO RELATED APPLICATIONS

This application claims the benefit of U.S. Provisional Patent Application No. 61/619,357, filed Apr. 2, 2012, titled "High Productivity Electrically Operated Turf Stacking System for Automated Turf Harvesting."

BACKGROUND

Turf grass (sod) is a living organism that must be handled properly to ensure its survival when it is removed from one location and transplanted to another. It is cut into slabs that are removed from the field in a serial manner by a harvesting machine which operates continuously. The slabs are cut to a specific transverse width and longitudinal length by a cutting head during the harvesting operation A conveyor, which may be a chain or belt, carries slabs from the cutting head to a stacking head which picks up and stacks the slabs (e.g. on a pallet). Slabs may be passed to the stacking head flat or in rolls.

When slabs are stacked as rolls, several rolls are accumulated on the conveyor before they are picked up by the stacking head. Similarly, when slabs are stacked flat, one or more slabs are accumulated on the conveyor before they are picked up by the stacking head. If the flat slabs are picked up in pairs, their length is equal to one half of the length of the pallet; otherwise the slabs are the same length as the pallet.

Slabs are cut in widths that permit either two or three slabs to rest on a pallet side by side. For example, a 48 inch wide pallet would accommodate three rows of flat or rolled slabs that are sixteen inches wide, or two rows of flat or rolled slabs that are 24 inches wide. Once the pallet contains the desired quantity of turf, the pallet is dropped in the field to be retrieved by other means.

Current stacking heads move using linear and/or rotary actuators that are hydraulically powered. The hydraulic valves that power these stacking heads respond relatively slowly to control signals. This slow response time limits the speed at which hydraulically powered stacking heads can be used while still providing accurate stacking of the slabs.

Servo-hydraulic control valves may be used to improve the performance of high speed hydraulic systems. However, these servo-hydraulic control valves are significantly more expensive to install because they are manufactured with very small clearances and tight tolerances. The small clearances are sensitive to contaminant particles that require more aggressive filtration to remove than is common on agricultural equipment. As a result, servo-hydraulic valves are generally considered to be too expensive for sod harvesting equipment.

When using hydraulic valves, it is also difficult to suppress the vibrations caused by the movements of the stacking head. For example, to allow the use of some hydraulic valves, such as proportional valves, some harvesters use an additional ground roller made of steel. This roller is pressed down on the ground directly beneath the point where the stacking head picks up the slab from the conveyor. Because of the high stiffness of the roller it transmits some of the stacking head reaction forces directly to the ground. Using this additional roller is undesirable because of its added weight and cost.

Additionally, proportional valves typically do not have built in feedback mechanisms that give the controller information about the valve spool position. As such, it is difficult for the controller to determine when the valve is not functioning properly without adding additional sensors to the system.

When rotary hydraulic motors are used, the angular position of the stacking head cannot be adequately controlled to hold the stacking heads in place when operating on fields that are sloped. For example, when operating on sloped fields, the stacking head can drift out of position leading to stacking errors. If the stacking head drifts out of position when dwelling over the conveyor waiting for a slab to come into position, it can damage the head and the conveyor when it tries to pick up the slab.

An additional difficulty with hydraulic systems is that hydraulic flow losses in plumbing and valves are strongly dependent on temperature. Because of this, hydraulic systems require a significant warm up period to allow the hydraulic fluid to reach a specified temperature. This warm up period wastes fuel.

Linear type hydraulic actuators (cylinders) have internal and external seals that are adversely affected by high velocity moves. The combination of high cycle rates on the order of 2400 per hour and high velocities lead to fairly short lives and the onset of leaking after a few months operation. This typically necessitates the replacement of the actuator on a yearly basis.

In addition to the difficulties of designing a hydraulic based stacking head that can stack slabs quickly and accurately, such systems are also difficult and expensive to maintain. For example, to achieve desired speeds and accuracy, the hydraulic system requires more complex and expensive components. Also, operating the stacking head at such speeds leads to more frequent service and replacement of components.

Another problem that exists with current stacking mechanisms is that, due to the way that the slabs are stacked, the stack tends to become rounded on top. This rounding increases the risk that the stack will tip over or split apart. To address this rounding, current stacking mechanisms, once the pallet is full, lift the entire pallet up against a barrier which compacts the slabs on the pallet. This step of lifting the pallet is slow and requires the harvesting machine to temporarily stop until the full pallet has been compacted, dropped, and replaced.

BRIEF SUMMARY

The present invention extends to a stacking mechanism having electrical actuators for stacking slabs of sod on a sod harvesting machine. The electrical actuators allow the stacking head to be driven in three axes. The stacking mechanism also includes position feedback sensors for reporting the position of the stacking head to enable precision when operating the stacking head at a fast rate. The stacking mechanism of the present invention also provides temporary pallet support wings to enable the continued stacking of slabs of sod on one pallet even while another pallet is being dropped from the sod harvesting machine.

In some embodiments, the present invention is implemented as an electric actuator based stacking mechanism for a sod harvesting machine. The stacking mechanism includes a supporting mechanism positioned over a conveyor and a pallet support structure. The conveyor is configured to transport slabs of sod into position to be picked up for stacking, and the pallet support structure is configured to support a pallet on which the slabs of sod are stacked.

The stacking mechanism also includes a stacking head attached to the supporting mechanism in such a way that the stacking head is moveable in an x, y, and r axes. The stacking mechanism further includes one or more electrical actuators which apply physical forces to move the stacking head in the x, y, and r axes such that the stacking head is enabled to stack slabs of sod on the pallet in layers having alternating orientations.

In other embodiments, the present invention is implemented as a sod harvesting machine that includes a pallet support structure that is configured to support a pallet on which slabs of sod are stacked. The pallet support structure includes a primary support that supports a pallet as the pallet is filled with slabs of sod and lowers the full pallet to the ground, as well as temporary pallet support wings which extend out to temporarily support a new pallet while the full pallet is lowered to the ground such that slabs of sod can be stacked on the new pallet while the full pallet is lowered to the ground.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to a stacking mechanism having electrical actuators for stacking slabs of sod on a sod harvesting machine. The electrical actuators allow the stacking head to be driven in three axes. The stacking mechanism also includes position feedback sensors for reporting the position of the stacking head to enable precision when operating the stacking head at a fast rate. The stacking mechanism of the present invention also provides temporary pallet support wings to enable the continued stacking of slabs of sod on one pallet even while another pallet is being dropped from the sod harvesting machine.

In some embodiments, the present invention is implemented as an electric actuator based stacking mechanism for a sod harvesting machine. The stacking mechanism includes a supporting mechanism positioned over a conveyor and a pallet support structure. The conveyor is configured to transport slabs of sod into position to be picked up for stacking, and the pallet support structure is configured to support a pallet on which the slabs of sod are stacked.

The stacking mechanism also includes a stacking head attached to the supporting mechanism in such a way that the stacking head is moveable in an x, y, and r axes. The stacking mechanism further includes one or more electrical actuators which apply physical forces to move the stacking head in the x, y, and r axes such that the stacking head is enabled to stack slabs of sod on the pallet in layers having alternating orientations.

In other embodiments, the present invention is implemented as a sod harvesting machine that includes a pallet support structure that is configured to support a pallet on which slabs of sod are stacked. The pallet support structure includes a primary support that supports a pallet as the pallet is filled with slabs of sod and lowers the full pallet to the ground, as well as temporary pallet support wings which extend out to temporarily support a new pallet while the full pallet is lowered to the ground such that slabs of sod can be stacked on the new pallet while the full pallet is lowered to the ground.

Stacking Mechanism Having Electrically Powered Actuators

Figure 1A:
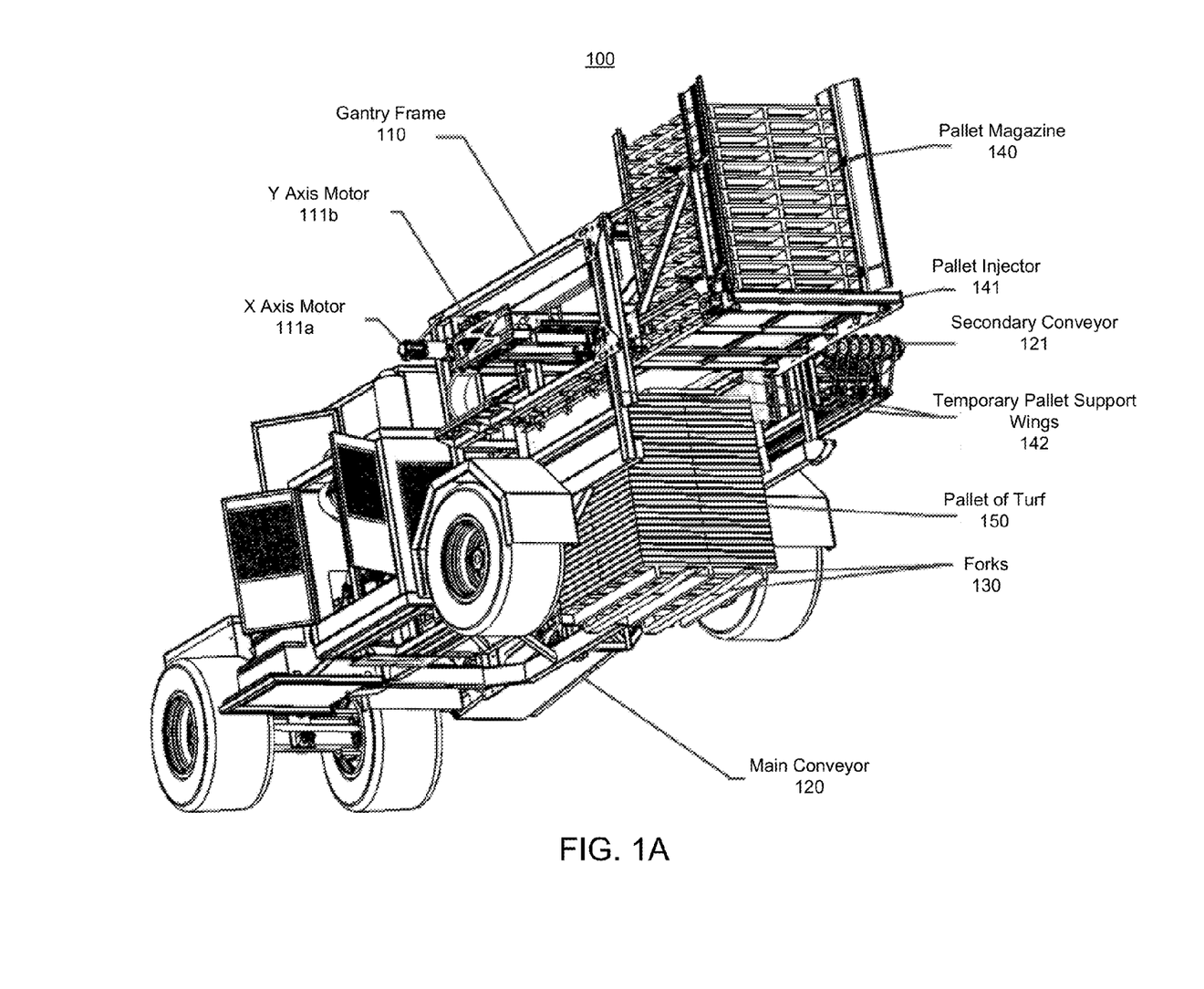
FIGS. 1A and 1B each illustrate a view of a sod harvesting machine that includes an electrical actuator based stacking mechanism.
Figure 1B:
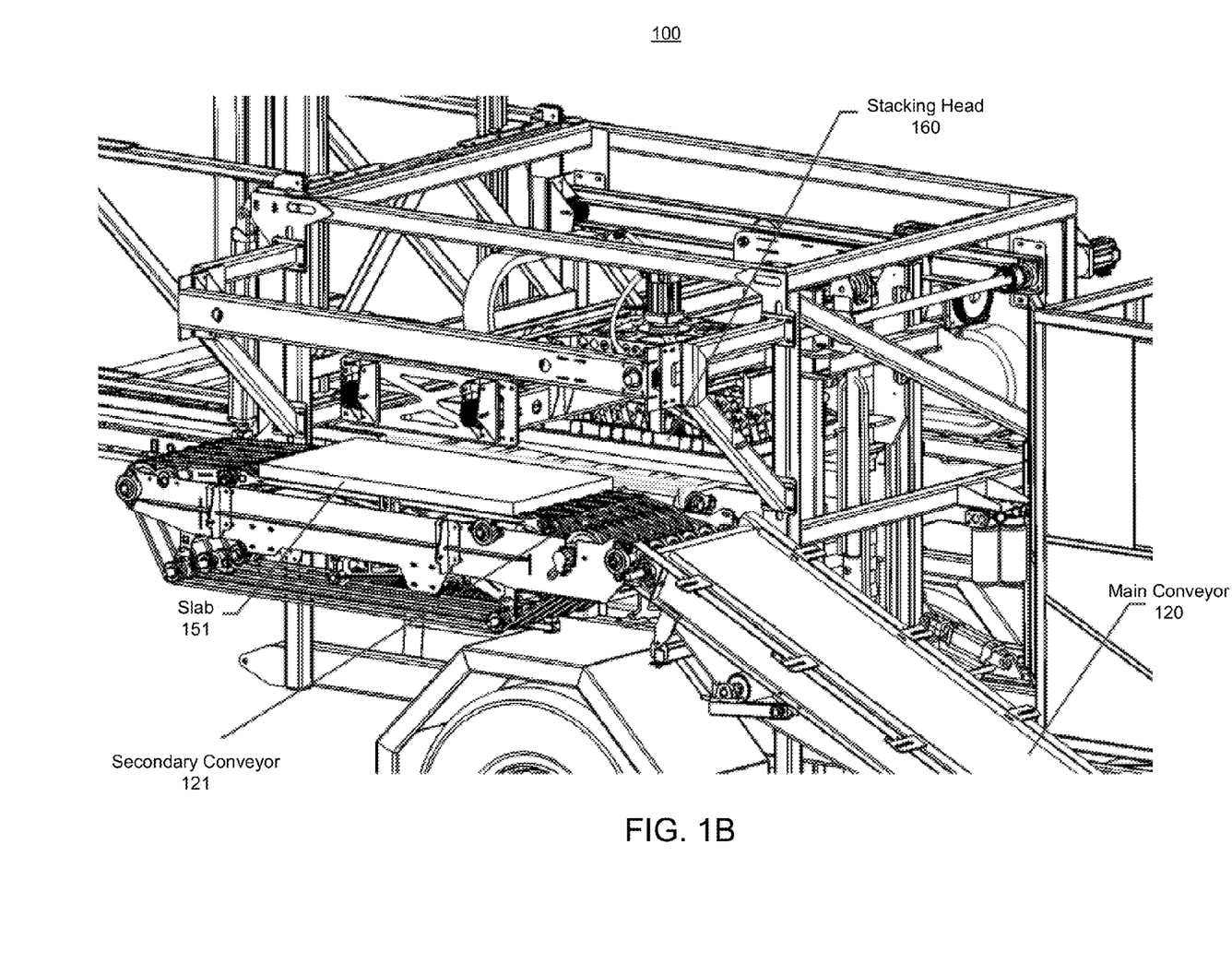

FIGS. 1A and 1B illustrate different views of a sod harvesting machine 100 that includes a stacking mechanism that employs electrically powered actuators. As shown, sod harvesting machine 100 includes a main conveyor 120 that carries slabs of sod to a secondary conveyor 121 from which the slabs (e.g. slab 151) are picked up by a stacking head 160. As better shown in FIGS. 2A and 2B, the stacking mechanism of sod harvesting machine 100 includes a gantry frame 110 which supports stacking head 160. Three actuators are used to drive stacking head 160: x axis motor 111a, y axis motor 111b, and r axis motor 111c (shown in FIGS. 2A and 2B).

Figure 2A:
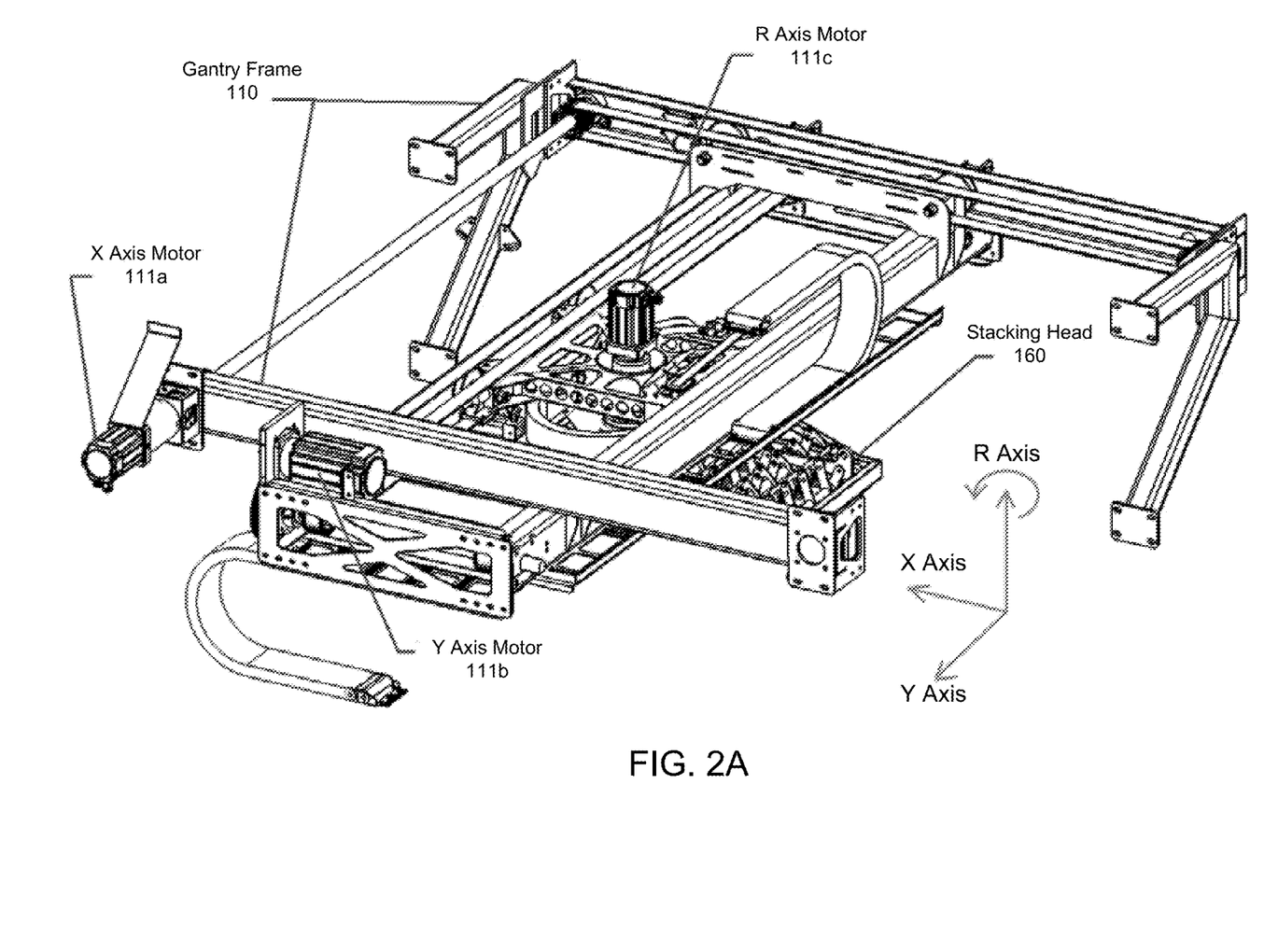
FIGS. 2A-2C illustrate various components of the stacking mechanism.
Figure 2B:
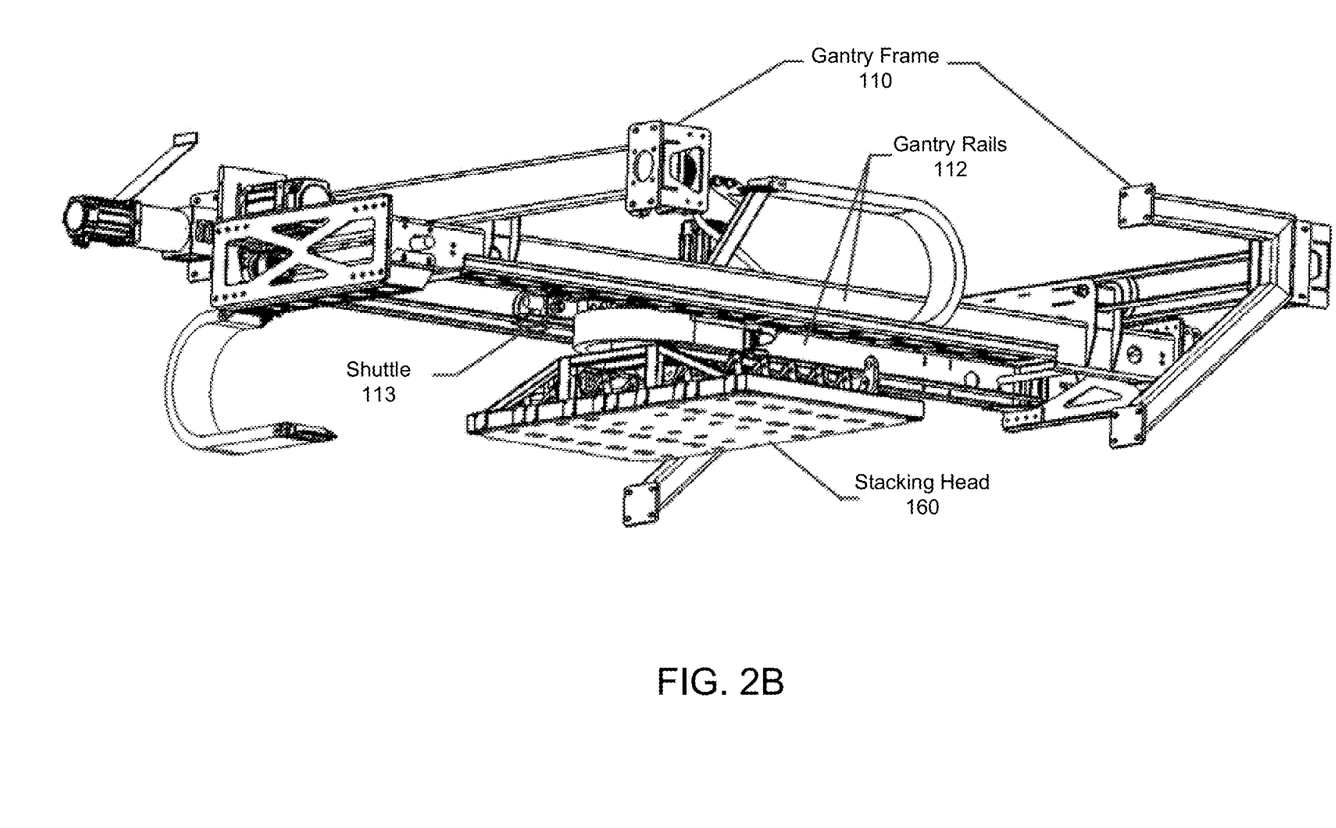

Gantry frame 110 includes gantry rails 112 to which stacking head 160 is attached. Stacking head 160 travels back and forth along gantry rails 112 via a shuttle 113. Similarly, gantry rails 112 travel back and forth along gantry frame 110. In this way, x axis motor 111a and y axis motor 111b can drive stacking head 160 in both the x and y axes. As shown in FIG. 2A, stacking head 160 is attached to gantry rails 112 is such a way that r axis motor 111c can rotate stacking head 160 in the r axis. Although the figures depict a gantry style stacking mechanism, the present invention can also be applied to an articulated arm style stacking mechanism.

Figure 2C:
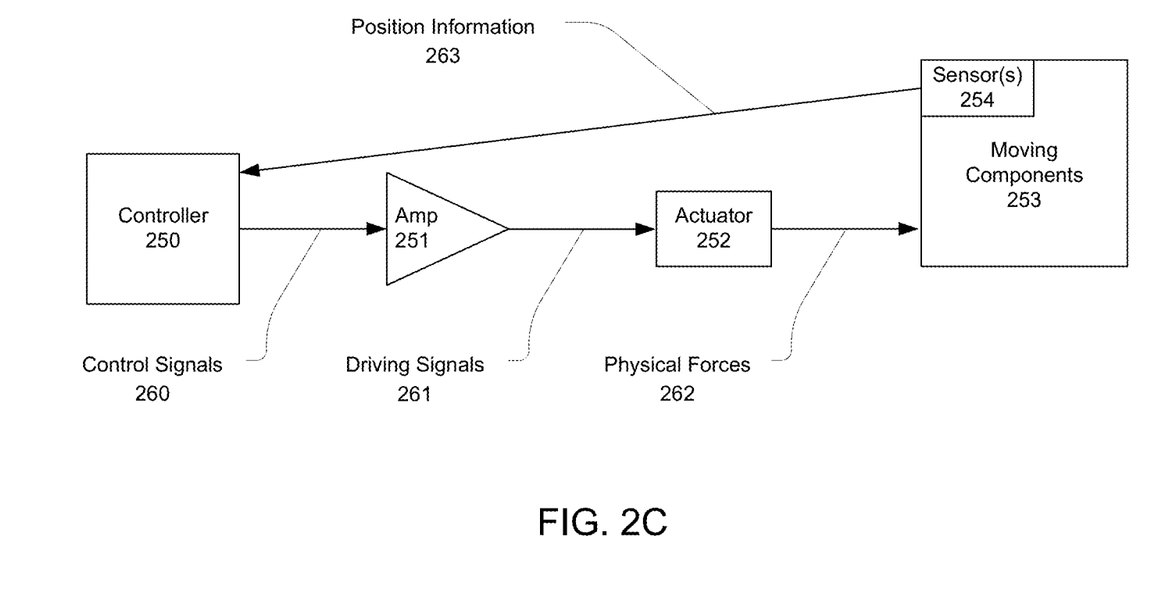

FIG. 2C provides a block diagram depicting how the electrical actuators are driven. Controller 250 (e.g. a computing system) generates control signals 260 which are output to amp 251. Amp 251 amplifies or otherwise modifies control signals 260 to output driving signals 261 to actuator 252. Actuator 252 (which is some embodiments may be a brushless DC motor) generates physical forces 262 which cause the moving components 253 of the stacking mechanism (e.g. gantry rails 112, shuttle 113, and stacking head 160) to move in the desired direction (e.g. x, y, or r direction). Sensors 254 detect the current position of moving components 253 and feed back position information 263 to controller 250. Based on position information 263, controller 250 can output control signals 260 to position moving components 253 in a highly accurate and consistent way. Each actuator (e.g. motors 111a-111c) can be driven in this way.

The configuration in FIG. 2C illustrates the relative simplicity of the driving circuitry. In contrast to hydraulic systems which require pumps, valves, fluid lines, etc., the electrical actuator based stacking mechanism of the present invention only requires a few electrical components for generating appropriate drive signals based on sensor feedback, and actuators to generate physical forces based on the drive signals. These components are generally cheaper, easier to install and maintain, more accurate, and more durable than hydraulic components.

Returning again to FIGS. 1A-2B, Y axis motor 111b drives stacking head 160 side to side (i.e. perpendicular to the direction that sod harvesting machine 100 is traveling) between secondary conveyor 121 and a pallet 150 supported by forks 130. While positioned over secondary conveyor 121, stacking head 160 picks up one or more slabs of sod. Then, y axis motor 111b drives stacking head 160 to be positioned over pallet 150 where the slabs of sod are released.

To enable slabs to be stacked side by side, x axis motor 111b moves stacking head 160 forward and back (i.e. parallel with the direction that sod harvesting machine 100 is traveling). This x axis movement is better shown in FIG. 4.

Figure 3:
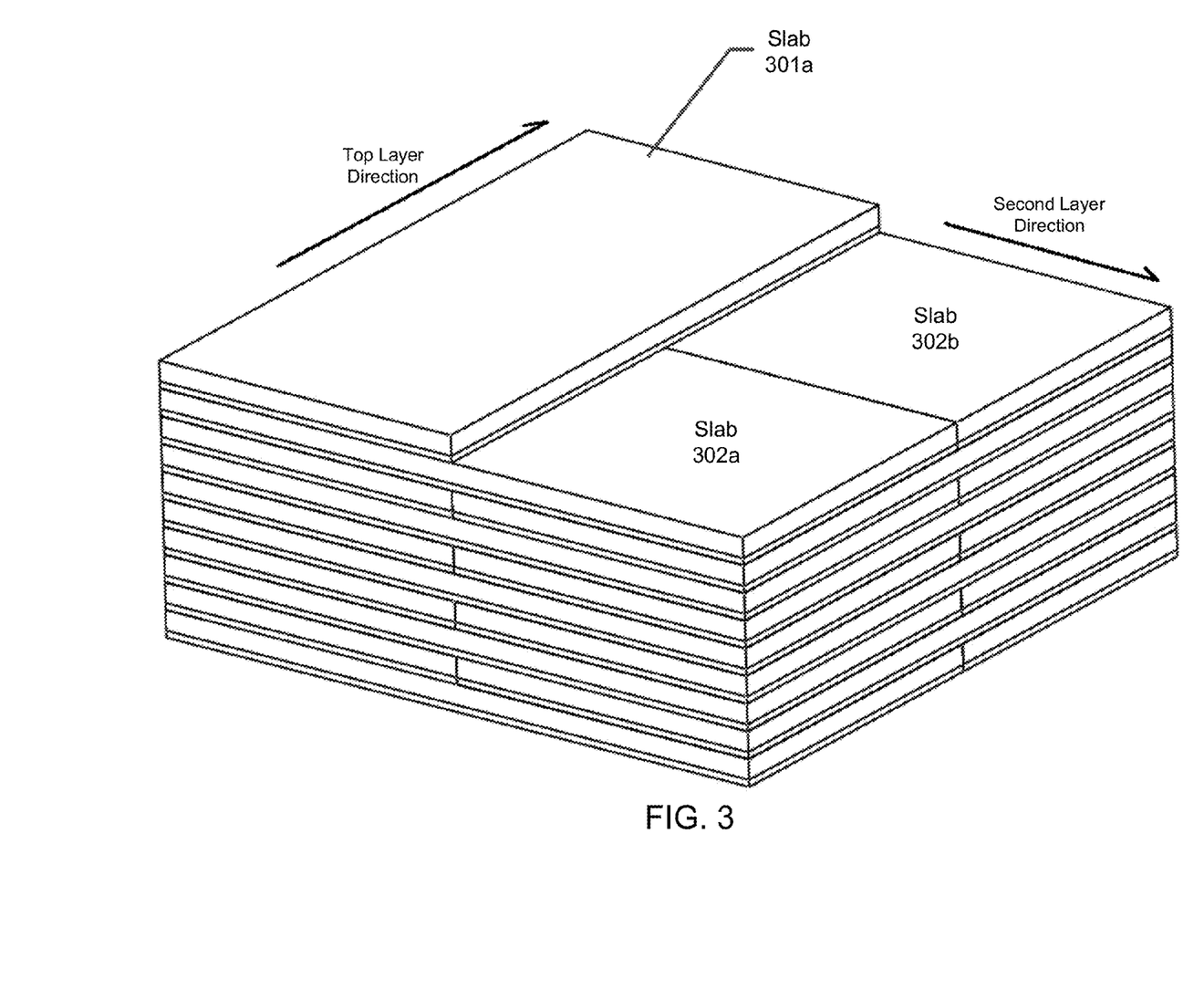
FIG. 3 illustrates an example of a stack of slabs of sod that can be created using the stacking mechanism.

R axis motor 111c enables stacking head 160 to be rotated to alternate the direction of slabs in different layers. In this way, different layers can be stacked with a 90 degree difference in orientation. FIG. 3 illustrates a stack of slabs having various layers including a top layer (slab 301a) and a second layer (slabs 302a and 302b). As shown, slabs 302a and 302b are oriented at a 90 degree angle from slab 301a.

Because stacking head 160 can be rotated in the r axis, layers of slabs on the pallet can be alternated to provide greater stability to the stack. Prior approaches have provided stability by offsetting the layers (i.e. placing all layers in the same orientation while shifting each layer forward or backward from the previous layer. Although offsetting the layers adds stability to the stack, it also causes the drying out of the edges of the slabs that extend out past the edges of an adjacent layer of slabs. By rotating the orientation of adjacent layers, the present invention can obtain greater stack stability without the risk of the edges drying out.

Another benefit of rotating layers is that there is no need to compact the stack. In other words, because layers do not need to be offset, which causes rounding of the stack, once a pallet is full, the stacking mechanism can immediately drop the pallet without compacting. This saves considerable time and therefore increases productivity.

Figure 4:
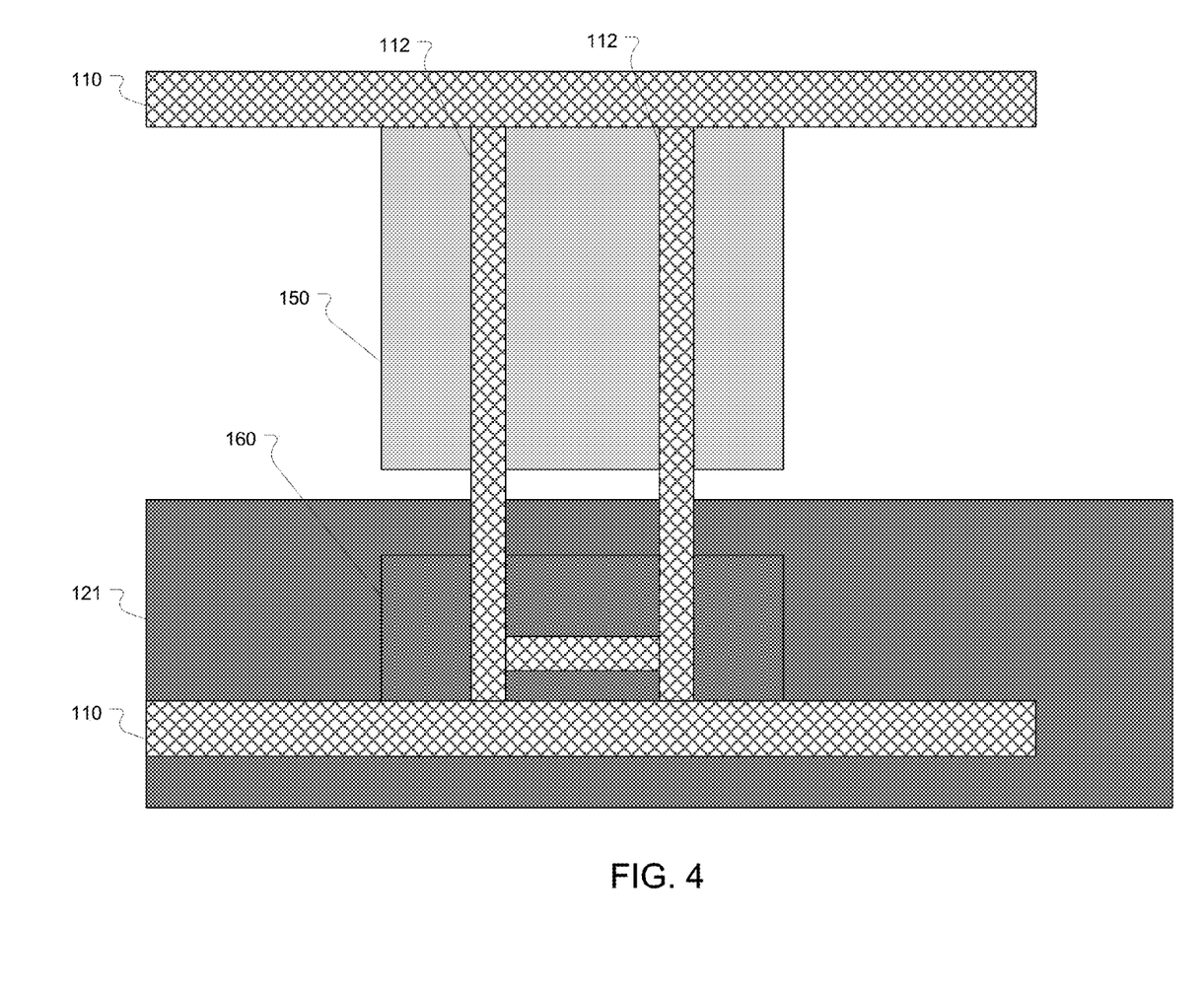
FIGS. 4 and 5A-5D represent the various positions a stacking head can be placed in using the stacking mechanism.

FIG. 4 illustrates how motors 111a-111c enable stacking head 160 to move in three axes. As shown, a top view of the stacking mechanism is represented. Stacking head 160 is shown as being positioned over secondary conveyor 121 in a longitudinal orientation. Stacking head 160 moves side-to-side along gantry rails 112 to transport slabs from secondary conveyor 121 to pallet 150.

FIGS. 5A-5D illustrate the various orientations stacking head 160 can be placed in to facilitate the stacking of slabs on pallet 150. Each of FIGS. 5A-5D illustrate the initial position of stacking head 160 over secondary conveyor 121 in dashes. The arrows indicate the movement of stacking head 160 to reach each position.

Figure 5A:
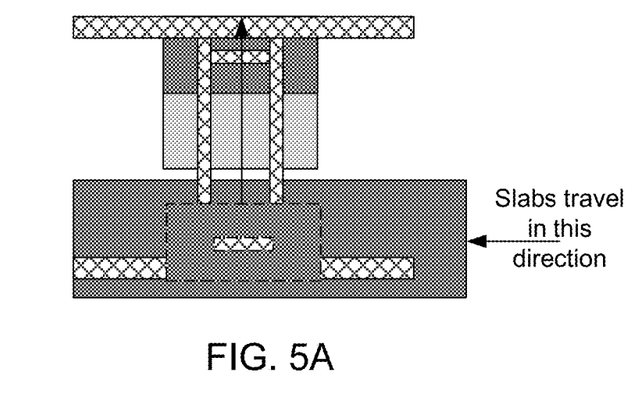
Figure 5B:
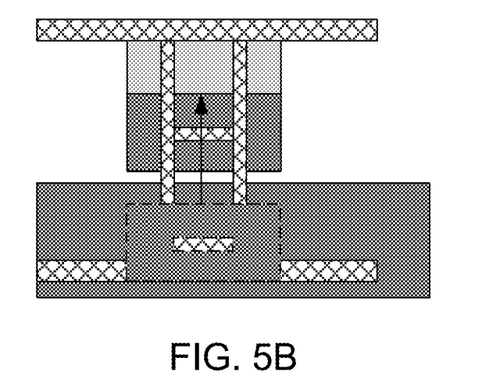

FIGS. 5A and 5B illustrate that stacking head 160 can move only in the y axis to stack slabs. With respect to the direction of travel of the sod harvesting machine, this movement in the y axis is from left to right. For example, the orientations shown in FIGS. 5A and 5B can represent the orientations used to stack slabs 302b and 302a respectively in FIG. 3.

Figure 5C:
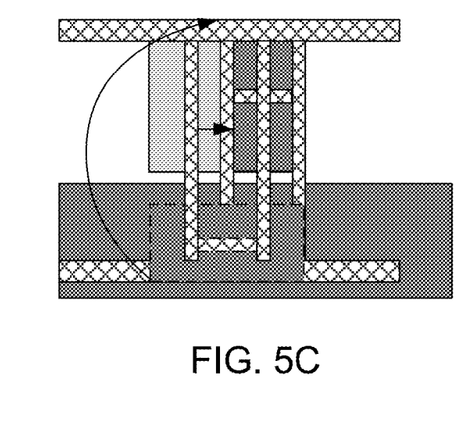
Figure 5D:
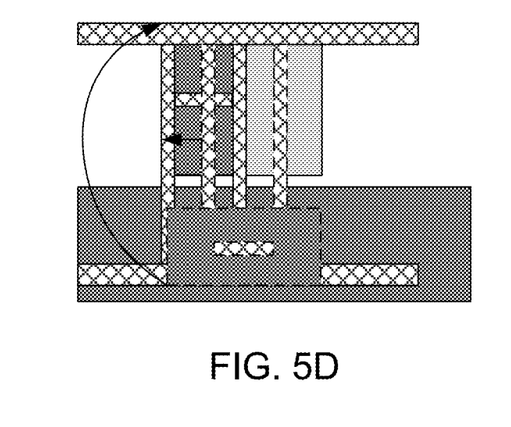

FIGS. 5C and 5D illustrate that stacking head 160 can move in the x, y, and r axes. For example, in FIG. 5C, stacking head 160 has been moved forward, to the left, and rotated clockwise with respect to the direction of travel. Similarly, in FIG. 5D, stacking head 160 has been moved backward, to the left, and rotated clockwise. Of course, stacking head 160 could equally be rotated counter-clockwise to reach the orientation shown in FIGS. 5C and 5D.

Figure 6A:
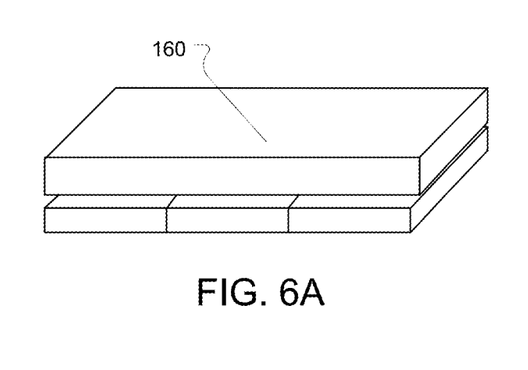
FIGS. 6A-6C illustrates how a stacking head can pick up one or more slabs of sod at a time.
Figure 6B:
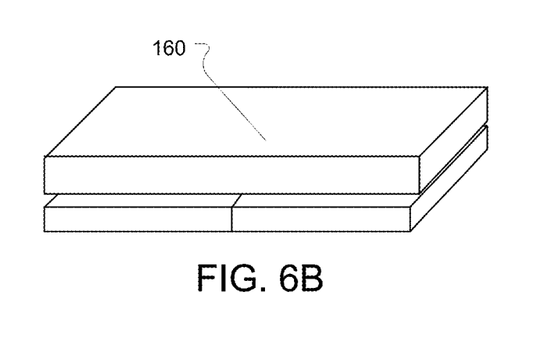
Figure 6C:
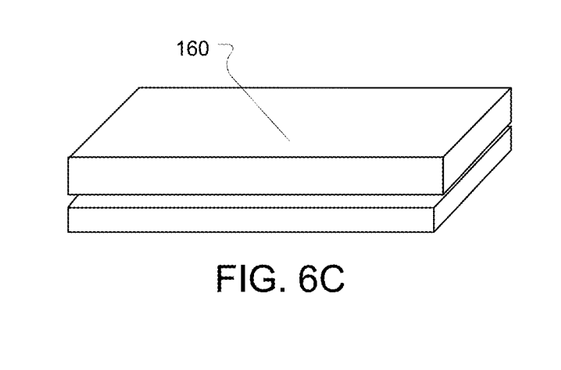

Stacking head 160 can pick up one or more slabs of sod each time it is positioned over secondary conveyor 121. FIGS. 6A-6C represent various examples of how slabs can be configured for pick-up by stacking head 160. Specifically, FIGS. 6A-6C represent examples where stacking head 160 picks up three slabs, two slabs, and one slab at a time.

The stacking mechanism of the present invention provides many benefits. For example, because stacking head 160 is moved using electric actuators (motors), stacking head 160 can be positioned accurately even at high speeds. This accuracy allows stacking head 160 to be placed at the same relative positions (e.g. the orientations shown in FIGS. 4 and 5A-5D) which improves the quality of the stack of slabs on the pallet.

In other words, because the position of stacking head 160 can be controlled with tight precision, stacking head 160 can be positioned at the same position over conveyor 121 so that each slab (or set of slabs) of sod are positioned in the same manner with respect to stacking head 160. Similarly, stacking head 160 can be accurately positioned over the pallet in each orientation so that the slabs are stacked consistently in the same relative position. With reference to FIGS. 5A-5D, each time stacking head 160 is moved into the respective orientation, stacking head 160 will be positioned in the same relative location with respect to the pallet.

Also, the design of gantry frame 110 and gantry rails 112 allow the position of stacking head 160 to remain consistent even when operating on sloped surfaces. In other words, the gravitational force on stacking head 160 when operating on a slope will not cause stacking head 160 to deviate from the intended position.

Further, unlike current hydraulic driven systems, because the actuators are electrically driven, the stacking mechanism of the present invention does not require a warm-up period thus increasing productivity and reducing fuel consumption. Similarly, because the electric actuators are relatively insensitive to temperature, the stacking mechanism can perform consistently regardless of the outside temperature in which it is operated.

In addition to providing much greater positioning accuracy, the electrical components used in the stacking mechanism are generally less expensive, more efficient, require less frequent maintenance and replacement, and are easier to service and replace than current hydraulic systems.

Although the Figures illustrate the stacking of flat slabs of sod, the described stacking mechanism can equally be used to stack rolled slabs of sod. Accordingly, the present invention should not be limited to any particular type of slab.

Temporary Pallet Support Wings

Figure 7A:
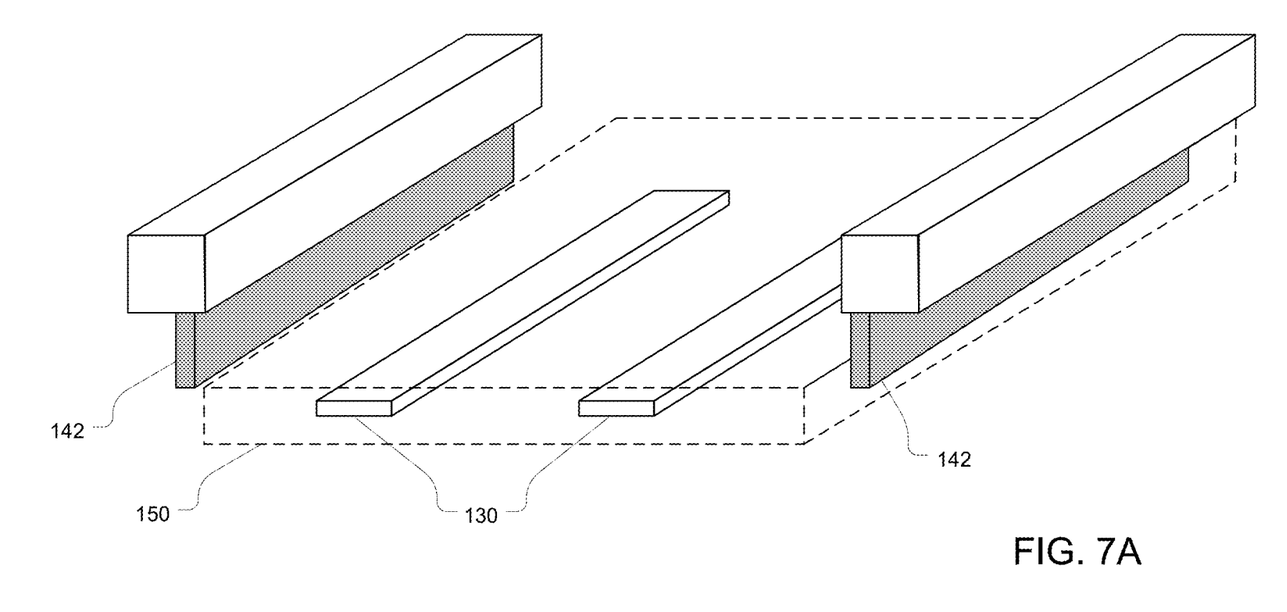
FIGS. 7A-7D illustrate how temporary pallet support wings can be used to support a new pallet while a full pallet is lowered to the ground.
Figure 7B:
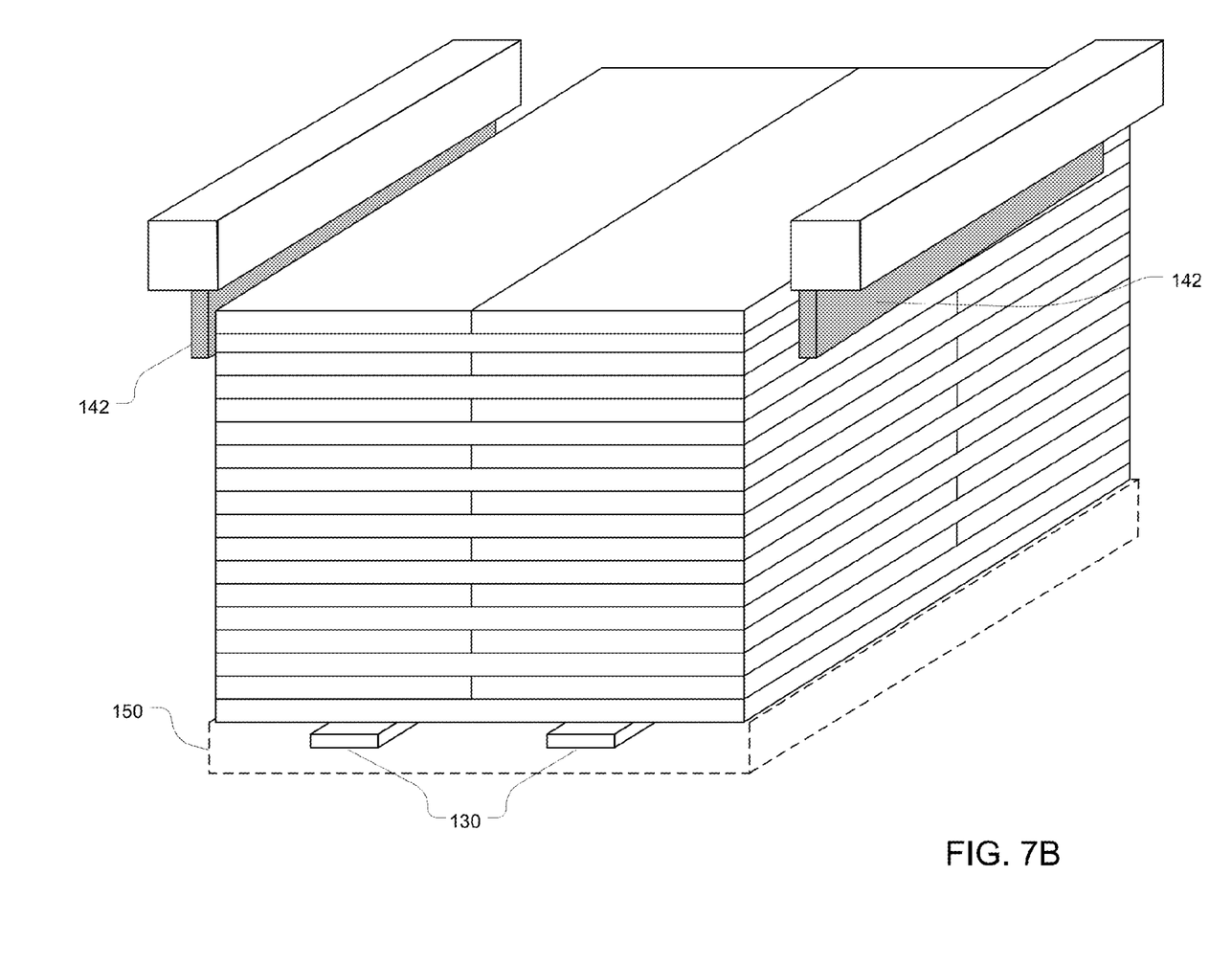
Figure 7C:
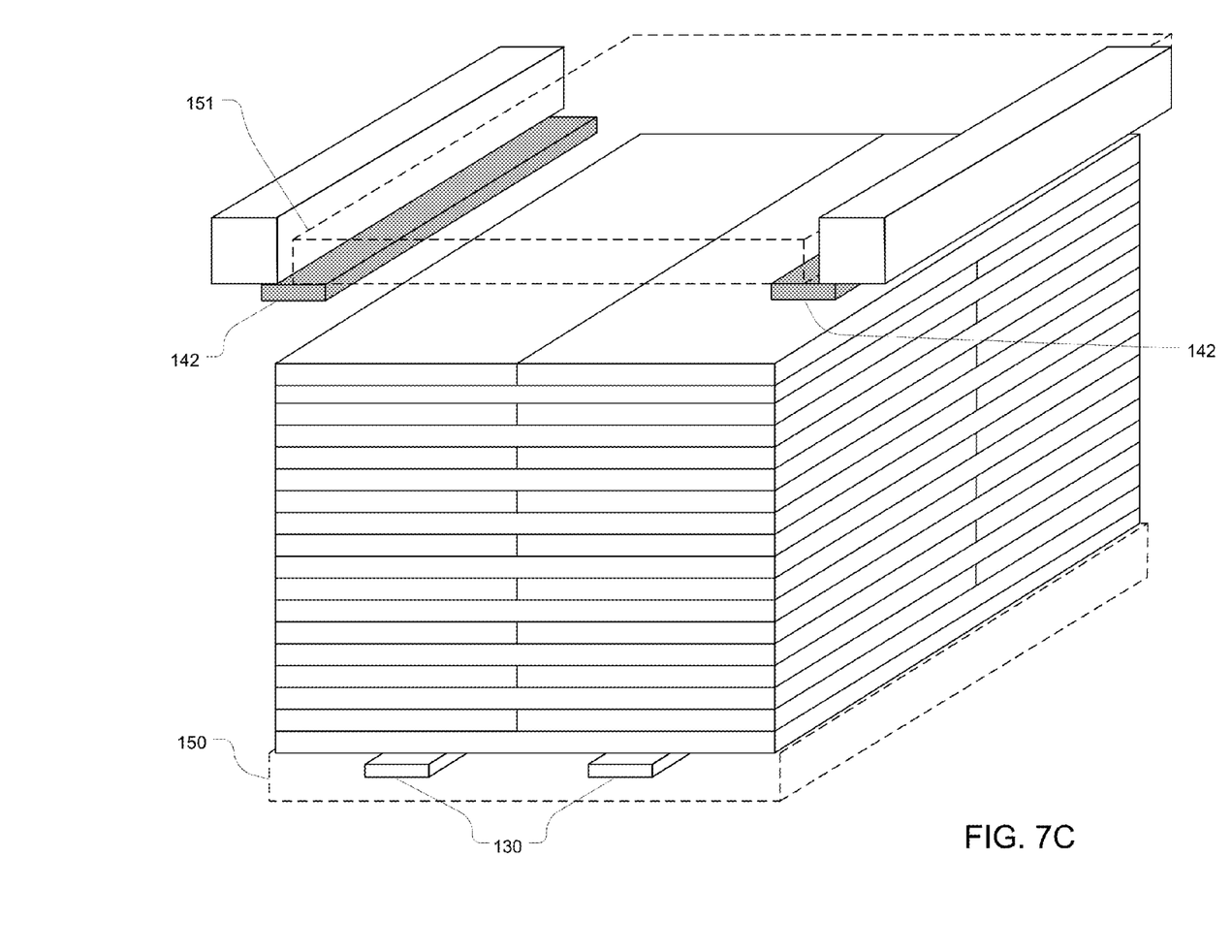

FIGS. 7A-7C illustrate how temporary pallet support wings 142 can be employed to allow a new pallet to be used even before a previous pallet has been dropped to the ground. In FIG. 7A, forks 130 support pallet 150 in a position where slabs can be stacked on pallet 150 by stacking head 160. Pallet support wings 142 are shown in a downward orientation and do not support a pallet at this point.

In FIG. 7B, forks 130 have lowered pallet 150 to accommodate various layers of sod. As with FIG. 7A, at this point, pallet support wings 142 remain in the downward orientation and do not support a pallet.

In FIG. 7C, however, pallet 150 is full and is being lowered to the ground. At this point, pallet support wings 142 are rotated out to form a ledge on which another pallet 151 can be supported. Accordingly, another pallet 151 is in position to receive slabs of sod from stacking head 160. In this way, stacking head 160 can continue to stack slabs on pallet 151 even while forks 130 are lowering pallet 150 to the ground.

Figure 7D:
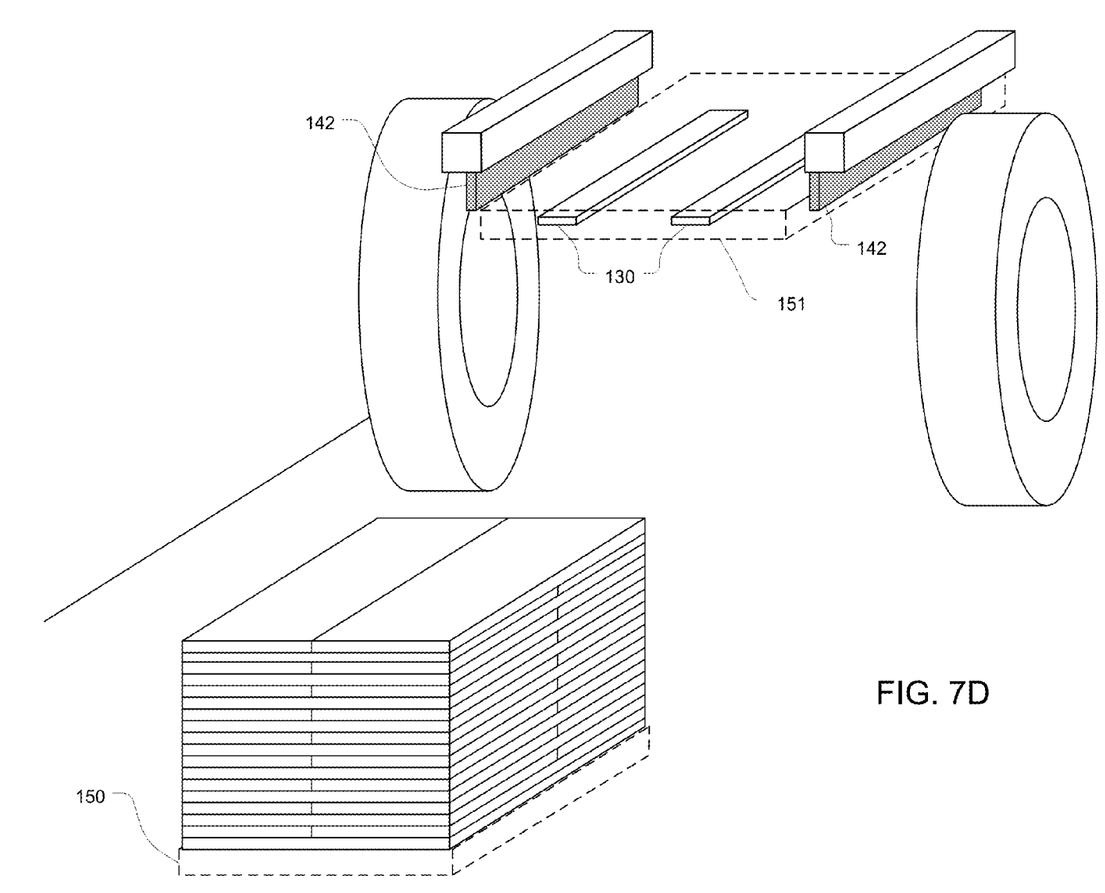

Finally, in FIG. 7D, pallet 150 is shown on the ground while forks 130 have been raised up to support pallet 151. Once forks 130 are in place underneath pallet 151, pallet support wings 142 can be lowered. At this point, the stacking mechanism has returned to the state shown in FIG. 7A. Although not shown in FIG. 7D, slabs would, in most cases, already be stacked on pallet 151 before forks 130 return to support pallet 151 and before pallet support wings 142 return to the downward orientation.

By using pallet support wings 142, a sod harvesting machine does not need to stop when a pallet is full. Without pallet support wings 142, the sod harvesting machine would have to stop harvesting sod long enough to allow forks 130 to drop pallet 150 to the ground and lift back up to support pallet 151. Accordingly, pallet support wings 142 both increase the ease of harvesting sod as well as the rate at which sod can be harvested.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvesting machine comprising:
    a cutting head configured to cut slabs of sod from the ground;
    a main conveyor and a secondary conveyor, the main conveyor being inclined between the cutting head and the secondary conveyor to allow the main conveyor to carry slabs of sod received from the cutting head to the secondary conveyor;
    a pallet support structure for supporting a pallet on which the slabs of sod are stacked, the pallet support structure being positioned alongside the main conveyor;
    an electric actuator based stacking mechanism for removing the slabs of sod from the main conveyor and stacking the slabs of sod on the pallet, the stacking mechanism comprising:
        a gantry frame comprising a first beam positioned above and extending along a first side of the pallet support structure opposite the secondary conveyor and a second beam positioned above and extending along a first side of the secondary conveyor opposite the pallet support structure;
        a first gantry rail and a second gantry rail, each gantry rail extending between the first and second beams of the gantry frame, each gantry rail being configured to travel in unison along a length of the first and second beams;
        a first motor coupled to the gantry frame, the first motor being configured to cause the first and second gantry rails to travel along the first and second beams of the gantry frame;
        a stacking head that is coupled between the first and second gantry rails via a shuttle, the shuttle being configured to travel along a length of the first and second gantry rails to position the stacking head over the secondary conveyor to remove one or more slabs of sod from the secondary conveyor and to position the stacking head over the pallet support structure to stack the one or more slabs of sod on the pallet;
        a second motor coupled to one or both of the first and second gantry rails, the second motor being configured to cause the shuttle to travel along the length of the first and second gantry rails;
        a third motor coupled to the stacking head, the third motor being configured to cause the stacking head to rotate with respect to the first and second gantry rails;
        a plurality of sensors configured to output signals that identify a current position of the first, second, and third motors; and
        a control unit configured to receive the signals and generate control signals for controlling the first, second, and third motors based on the identified current position of the first, second, and third motors.

2. The sod harvesting machine of claim 1, wherein the slabs of sod are one of flat slabs or rolled slabs.

3. The sod harvesting machine of claim 1, wherein the first, second, and third motors are each electric motors.

4. The sod harvesting machine of claim 3, wherein the first, second, and third motors are each brushless DC motors.

5. The sod harvesting machine of claim 1, wherein the control unit is configured to control the first, second, and third motors to cause a first layer of slabs of sod to include multiple rows that are oriented in a first direction, and to cause a second layer of slabs of sod to include multiple rows that are oriented in a second direction, the second direction being perpendicular to the first direction.

6. The sod harvesting machine of claim 5, wherein the control unit controls the second motor to cause the multiple rows of the first layer to be positioned at different positions along the length of the first and second gantry rails, and the control unit controls the first motor to cause the multiple rows of the second layer to be positioned at different positions along the length of the gantry frame and the third motor to cause the multiple rows of the second layer to be perpendicular to the multiple rows of the first layer.

7. The sod harvesting machine of claim 5, wherein each row includes multiple slabs of sod.

8. The sod harvesting machine of claim 1, wherein the pallet support structure comprises:
    forks on which a first pallet rests while the slabs of sod are stacked on the first pallet, the fork being configured to lower as slabs of sod are stacked on the first pallet;
    a pallet magazine configured to contain a plurality of pallets prior to the pallets being used to stack the slabs of sod;
    temporary pallet support wings; and
    a pallet injector;
    wherein the control unit is further configured to cause the pallet injector to retrieve a second pallet from the pallet magazine, extend the temporary pallet support wings, and place the second pallet on the temporary pallet support wings while the forks are lowering the first pallet to the ground, and to cause the temporary pallet support wings to withdraw once the forks have returned to support the second pallet.

9. The sod harvesting machine of claim 8, wherein the pallet magazine extends from the gantry frame.

10. The sod harvesting machine of claim 1, wherein the first gantry rail is coupled to the second gantry rail.

11. The sod harvesting machine of claim 1, wherein ends of the first and second gantry rails extend beyond the first and second beams.

12. The sod harvesting machine of claim 1, wherein the electric actuator based stacking mechanism further comprises:
a first, second, and third amplifier for amplifying the controls signals for controlling the first second, and third motors respectively.

13. The sod harvesting machine of claim 1, wherein the control unit generates the controls signals for controlling the first, second and third motors based on a comparison of the identified current position of the first, second, and third motors and a desired position of the first, second, and third motors.

14. A sod harvesting machine comprising:
a control unit;
a cutting head configured to cut slabs of sod from the ground;
a main conveyor and a secondary conveyor, the main conveyor being inclined between the cutting head and the secondary conveyor to allow the main conveyor to carry slabs of sod received from the cutting head to the secondary conveyor;
a pallet support structure for supporting a pallet on which the slabs of sod are stacked, the pallet support structure being positioned alongside the main conveyor, the pallet support structure comprising:
  forks on which a first pallet rests while the slabs of sod are stacked on the first pallet, the fork being configured to lower as slabs of sod are stacked on the first pallet;
  a pallet magazine configured to contain a plurality of pallets prior to the pallets being used to stack the slabs of sod;
  temporary pallet support wings; and
  a pallet injector;
  wherein the control unit is configured to cause the pallet injector to retrieve a second pallet from the pallet magazine, extend the temporary pallet support wings, and place the second pallet on the temporary pallet support wings while the forks are lowering the first pallet to the ground, and to cause the temporary pallet support wings to withdraw once the forks have returned to support the second pallet;
an electric actuator based stacking mechanism for removing the slabs of sod from the main conveyor and stacking the slabs of sod on the pallet, the stacking mechanism comprising:
  a gantry frame comprising a first beam positioned above and extending along a first side of the pallet support structure opposite the secondary conveyor and a second beam positioned above and extending along a first side of the secondary conveyor opposite the pallet support structure;
  a first gantry rail and a second gantry rail, each gantry rail extending between the first and second beams of the gantry frame, each gantry rail being configured to travel in unison along a length of the first and second beams;
  a first motor coupled to the gantry frame, the first motor being configured to cause the first and second gantry rails to travel along the first and second beams of the gantry frame;
  a stacking head that is coupled between the first and second gantry rails via a shuttle, the shuttle being configured to travel along a length of the first and second gantry rails to position the stacking head over the secondary conveyor to remove one or more slabs of sod from the secondary conveyor and to position the stacking head over the pallet support structure to stack the one or more slabs of sod on the pallet;
  a second motor coupled to one or both of the first and second gantry rails, the second motor being configured to cause the shuttle to travel along the length of the first and second gantry rails;
  a third motor coupled to the stacking head, the third motor being configured to cause the stacking head to rotate with respect to the first and second gantry rails; and
  a plurality of sensors configured to output signals that identify a current position of the first, second, and third motors;
  wherein the control unit is configured to receive the signals and generate control signals for controlling the first, second, and third motors based on the identified current position of the first, second, and third motors, the control unit further being configured to control the first, second, and third motors to cause a first layer of slabs of sod to include multiple rows that are oriented in a first direction, and to cause a second layer of slabs of sod to include multiple rows that are oriented in a second direction, the second direction being perpendicular to the first direction.

15. The sod harvesting machine of claim 14, wherein the slabs of sod are one of flat slabs or rolled slabs.

16. The sod harvesting machine of claim 14, wherein the first, second, and third motors are each electric motors.

17. The sod harvesting machine of claim 16, wherein the first, second, and third motors are each brushless DC motors.

18. The sod harvesting machine of claim 14, wherein ends of the first and second gantry rails extend beyond the first and second beams.

19. The sod harvesting machine of claim 14, wherein the electric actuator based stacking mechanism further comprises:
a first, second, and third amplifier for amplifying the controls signals for controlling the first second, and third motors respectively.

20. The sod harvesting machine of claim 14, wherein the control unit generates the controls signals for controlling the first, second and third motors based on a comparison of the identified current position of the first, second, and third motors and a desired position of the first, second, and third motors.

* * * * *